United States Patent [19]

Hunt et al.

[11] 4,214,278
[45] Jul. 22, 1980

[54] EDITING SYSTEM FOR VIDEOTAPE SOUND

[75] Inventors: Brian K. Hunt, Hamilton; Leopold H. O'Donnell, Toronto, both of Canada

[73] Assignee: SCP Producer's Services Limited, Toronto, Canada

[21] Appl. No.: 964,903

[22] Filed: Nov. 30, 1978

[51] Int. Cl.² .................. G11B 27/02; H04N 5/78
[52] U.S. Cl. ................................ 360/14; 360/72.2
[58] Field of Search ............... 360/14, 13, 72.2, 72.3, 360/74.4

[56] References Cited

U.S. PATENT DOCUMENTS

| | | | |
|---|---|---|---|
| 3,026,369 | 3/1962 | Lohmann et al. | 360/14 |
| 3,610,815 | 3/1970 | Gould et al. | 360/14 |
| 3,740,463 | 6/1973 | Youngstrom et al. | 360/14 |
| 3,748,381 | 7/1973 | Strobele | 360/14 |
| 3,824,336 | 7/1974 | Gould et al. | 360/14 |
| 3,925,815 | 12/1975 | Lemelson | 360/14 |
| 4,115,819 | 9/1978 | Shigeta | 360/14 |

*Primary Examiner*—Alfred H. Eddleman
*Attorney, Agent, or Firm*—Ridout & Maybee

[57] ABSTRACT

A method and apparatus is provided enabling sound editing for videotape to be carried out using procedures substantially identical to those conventionally used when the picture carrying medium is photographic film. Editing is carried out using a mechanical synchronizer, the tape drive of a videotape playback apparatus being slaved to the synchronizer shaft using control signals generated by comparing codes, updated in accordance with cumulative movements of the shaft, with codes recorded on the videotape to identify successive frames of picture information thereon.

16 Claims, 5 Drawing Figures

EDITING SYSTEM FOR VIDEOTAPE SOUND

FIELD OF THE INVENTION

This invention relates to an editing system for videotape sound.

BACKGROUND OF THE INVENTION AND PRIOR ART STATEMENT

In the motion picture industry, there is an increasing shift from the use of photographic film as the picture carrying medium to the use of magnetic tape (videotape). Even when material is initially recorded on photographic film, and/or the final prints are to be on photographic film, there are time and cost advantages in being able to use videotape during the editing process. The use of videotape does however have some disadvantages so far as the editing process is concerned, particularly during sound editing. The conventional mode of editing sound when the picture information is on photographic film is to use a mechanical synchronizer in which the picture film and a film or films carrying the sound track or tracks (the term film is used for the carrier medium whether the sound is recorded optically or magnetically) can be advanced or moved backwards in unison, for example by means of a common drive shaft with ganged sprockets, as in the Moviola (trade mark) synchronizer and flat bed type synchronizers. The operator adjusts the relationship of the various films by lifting them out of engagement with the drive shaft sprockets and moving them longitudinally. This mode of operation is dependent on the ability to pass the picture film over the shaft together with the sound films so that the picture information is presented to the operator in a manner precisely related to the position of the synchronizer shaft. This is not of course practical with videotape, upon which the picture information is not directly visible to the operator and which is not adapted for the positive mechanical drive permitted by the sprocket holes in conventional film. This has meant that entirely different editing techniques have been required for editing videotape sound, and editors accustomed to the use of mechanical synchronizers have found it difficult to adapt to such techniques. Moreover, it has remained difficult to achieve accurate editing of sound films in conjunction with videotaped picture information, particularly with the cheaper helical scan recorders, since cueing information conventionally recorded on longitudinal tracks on the tape cannot be recovered whilst the tape is stationary during display of a single frame, or the tape is being moved frame by frame, or at a low rate of speed, or backwards.

Proposals have been made to introduce coded information identifying individual frames into the vertical intervals of the video information recorded on videotape so that this information may be recovered even when a single frame is being displayed during playback of the tape. Such proposals are contained in U.S. Pat. Nos. 3,925,815 (Lemelson), 3,748,381 (Strobele et al) and 3,740,463 (Youngstrom et al) but although such systems are undoubtedly useful in locating and identifying specific frames on the tape, they do not provide a means by which editors can employ the sound editing techniques they are accustomed to use when the picture information is on photographic film.

SUMMARY OF THE INVENTION

The present invention relates to a method and apparatus by means of which sound editing techniques subjectively similar to those conventionally employed for photographic picture film can be employed with videotape. The sound films are edited on a mechanical synchronizer having a conventional ganged synchronizer shaft which can be controlled by the operator in an entirely conventional manner, and frames of the video information on the tape will be located and displayed almost as if they were on a film driven by the synchronizer shaft.

The invention provides a method of editing sound films in association with videotape recordings which comprises slaving the movements of videotape past a video playback head assembly to the movement of a synchronizer shaft synchronizing at least one sound film being edited, the slaving being achieved by maintaining parity between coded signals associated with frames of video information recovered from the tape by the playback head assembly and coded signals generated in response to the movements of the synchronizer shaft, and displaying the recovered video information. By this means, movements of the synchronizer shaft will result in display of the picture information on the videotape just as if the information was on photographic film driven by sprockets on the synchronizer shaft and projected for viewing by the operator.

More specifically the invention provides a method of editing sound films for videotape recordings comprising generating signals indicative of the extent and direction of angular movement of a multigang synchronizer shaft which synchronizes the sound films being edited, using said signals proportionately to alter the count of an up/down counter in accordance with the extent and direction of said angular movements so as to provide a counter output encoded in accordance with a progressive incremental numerical code, recovering a video signal frame by frame from a videotape and recovering from said video signal encoded signals associated with the frames thereof, said encoded signals being encoded according to the same system as said counter output, comparing said counter output and said recovered encoded signals in a magnitude comparator, and using the output of said comparator to control a motor moving said videotape past a head assembly used to recover successive frames of the video signal in such a direction as to reduce any difference between the counter output and the recovered encoded signal as detected by the magnitude comparator until or unless the comparator indicates parity thereof.

A preferred version of the method when used with helical scan videotape recorders includes the further step of using the signals generated by angular movement of the shaft to adjust the position of the tape relative to the head assembly once the comparator indicates parity of the counter output and the recovered encoded signal. When the tape is stationary in a helical scan video recorder, the heads constituting the head assembly move at a slight angle to the recorded information on the tape and, unless the tape is precisely positioned relative to head assembly, parts of two tracks carrying adjacent frames will be recovered and displayed with a broken area between them. The adjustment provided above enables an operator to turn the synchronizer shaft so as to move the broken area up or down the display and out of the picture area, thus giving an effect comparable to moving conventional film in the gate of a projector although in the present instance the picture information itself does not move.

The invention also extends to apparatus for editing sound for videotape recordings comprising a drive shaft for ganged positive engagement with at least one sound film, means to generate signals indicative of the extent and direction of angular movement of said shaft, an up/down counter receiving said signals and counting in response to said signals to provide an output signal in accordance with a progressive incremental numerical code, a videotape recorder having a video playback unit for recovering successive frames of a video signal recorded on the video tape as successive portions of the tape are brought adjacent a video playback head assembly in the playback unit, reversible drive means to move said tape in either direction past said playback head, code recovery means to recover signals identifying each frame of said video signal and encoded according to the same progressive incremental numerical code as the counter output, a comparator receiving and comparing the numerical magnitudes of the output signal of the counter and the signal recovered by the code recovery means and providing outputs in accordance with the results of the comparison, and means receiving said outputs and controlling said drive means in accordance therewith so that the device means moves the tape in such a direction as to cause the signal recovered by the code recovery means to approach parity with that appearing at the output of the counter.

SHORT DESCRIPTION OF THE DRAWINGS

Further aspects of the invention will become apparent from the following description of a preferred embodiment of the invention with reference to the accompanying drawings, in which:

FIG. 1 is a highly simplified block diagram of apparatus in accordance with the invention, illustrating the basic principles of its operation, FIG. 2 is a diagrammatic illustration of those mechanical integers of the apparatus which are not parts of the videotape playback unit comprised in the apparatus, FIGS. 3 and 4 together form a block diagram of the electronic integers of the apparatus which are relevant to the invention, and FIG. 5 illustrates how the apparatus may be employed to prepare encoded videotape for use in the editing system of the invention.

DESCRIPTION OF THE PREFERRED EMBODIMENT

Figure 1:
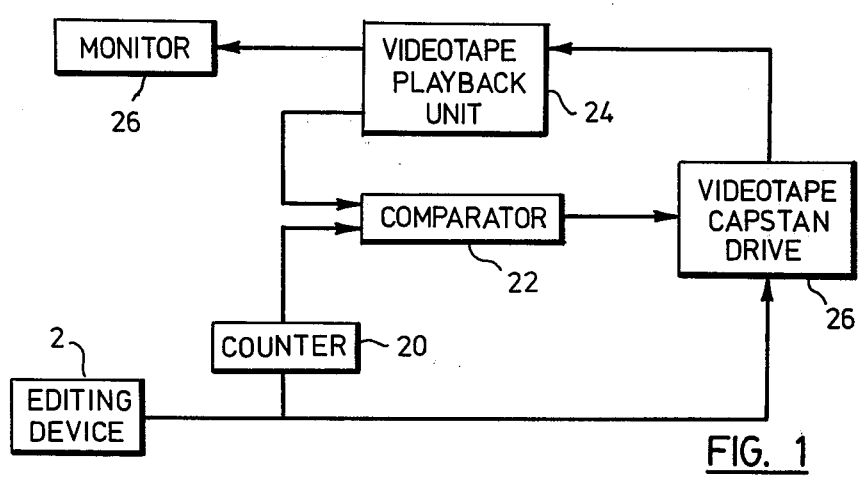
Figure 2:
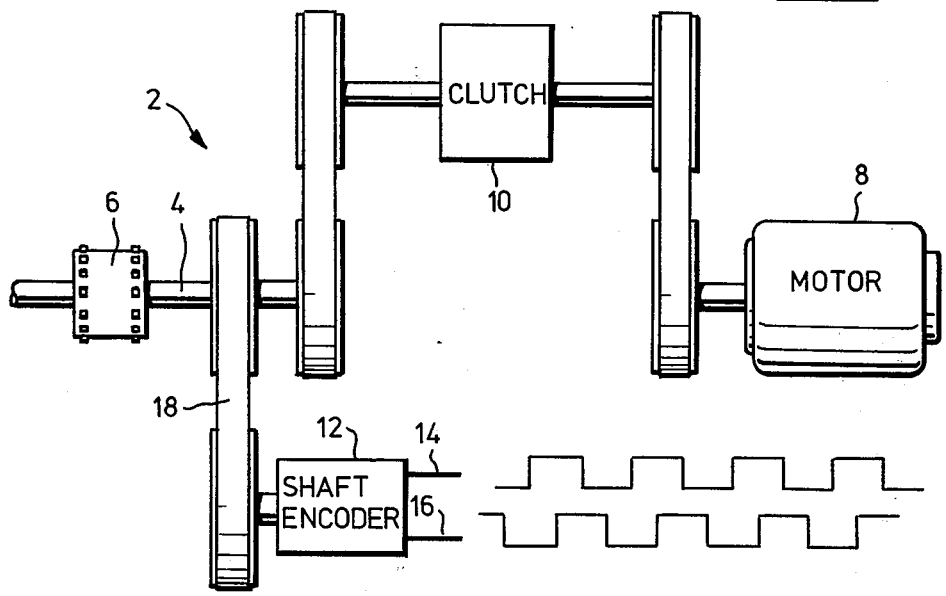
Figure 5:
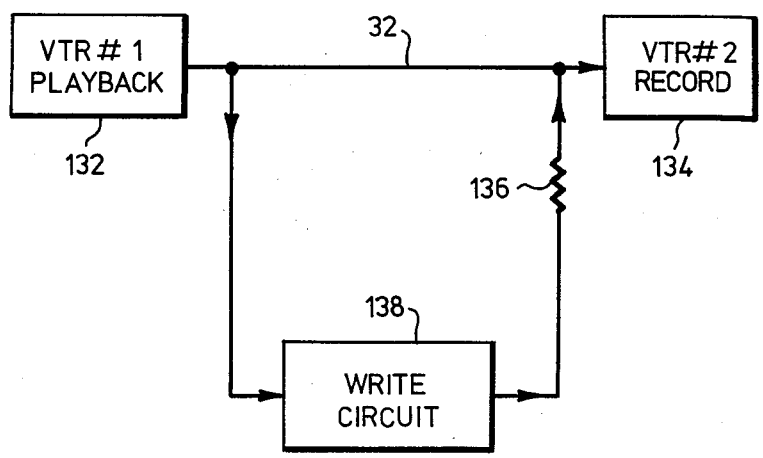

Referring to FIGS. 1 and 2, an editing device 2 is basically a conventional mechanical synchronizer having a drive shaft 4 with a number of ganged sprockets 6 (only part of the shaft and one sprocket is shown in FIG. 2). The shaft may be driven by a reversible motor 8 through drive belts and pulleys and a releasable clutch 10. When the clutch 10 is released, the shaft 4 may be turned manually in either direction. Sound films to be edited are driven in parallel by the sprockets on the shaft and are accessible to an operator for cutting whilst he may alter the relationship of the films to each other and to the shaft by lifting them clear of the sprockets. The editing device differs from the conventional arrangement in that instead of direct driving engagement with a photographic picture film, the shaft drives a shaft encoder 12 so as to provide two trains of square wave pulses on output lines 14, 16, the pulse trains being in quadrature.

Typically, the driving connection from the encoder to the shaft, which may be by means of a toothed belt 18, is such as to provide twenty five output pulse cycles from the encoder for a movement of the shaft 4 providing an advance of the sound films through a distance which corresponds at normal playback speed to one frame period of the videotape, the sound for which is being edited. This period will normally be one thirtieth of a second in North America, since the videotape will be recorded at thirty frames per second. The sound films may be recorded at either 24 or 30 frames per second, both standards being accommodated merely by changing the drive ratio between the shaft 4 and the encoder 12. Other means could be utilized to signal the extent and direction of movement of the shaft 4, but the shaft encoder has the advantage that its quadrature pulse outputs can be processed to provide information to the direction of rotation.

The pulses from the encoder and a direction signal derived therefrom are used to increment or decrement an up/down counter 20 whose output forms a digital code word which is applied to a magnitude comparator 22 together with a similar digital code word recovered from successive frames of recorded video information in a videotape playback unit 24, the video information itself being displayed on a monitor 26. The coding of the code words is in a progressive incremental numerical code such that parity of the words applied to the comparator indicates synchronism of the videotape and the sound films on the synchronizer shaft to within a single frame of the video signal. This parity is achieved by using the comparator output to control the videotape capstan drive 26 which moves the tape past a rotating head assembly 28 (see FIG. 3) which recovers the video information from the tape, the control being such as to move the tape backwards or forwards until parity is achieved. Thereafter, fine adjustment of the tape position relative to the head assembly is achieved by using the signals obtained from the shaft encoder in the editing device to control the capstan drive 26.

Figure 3:
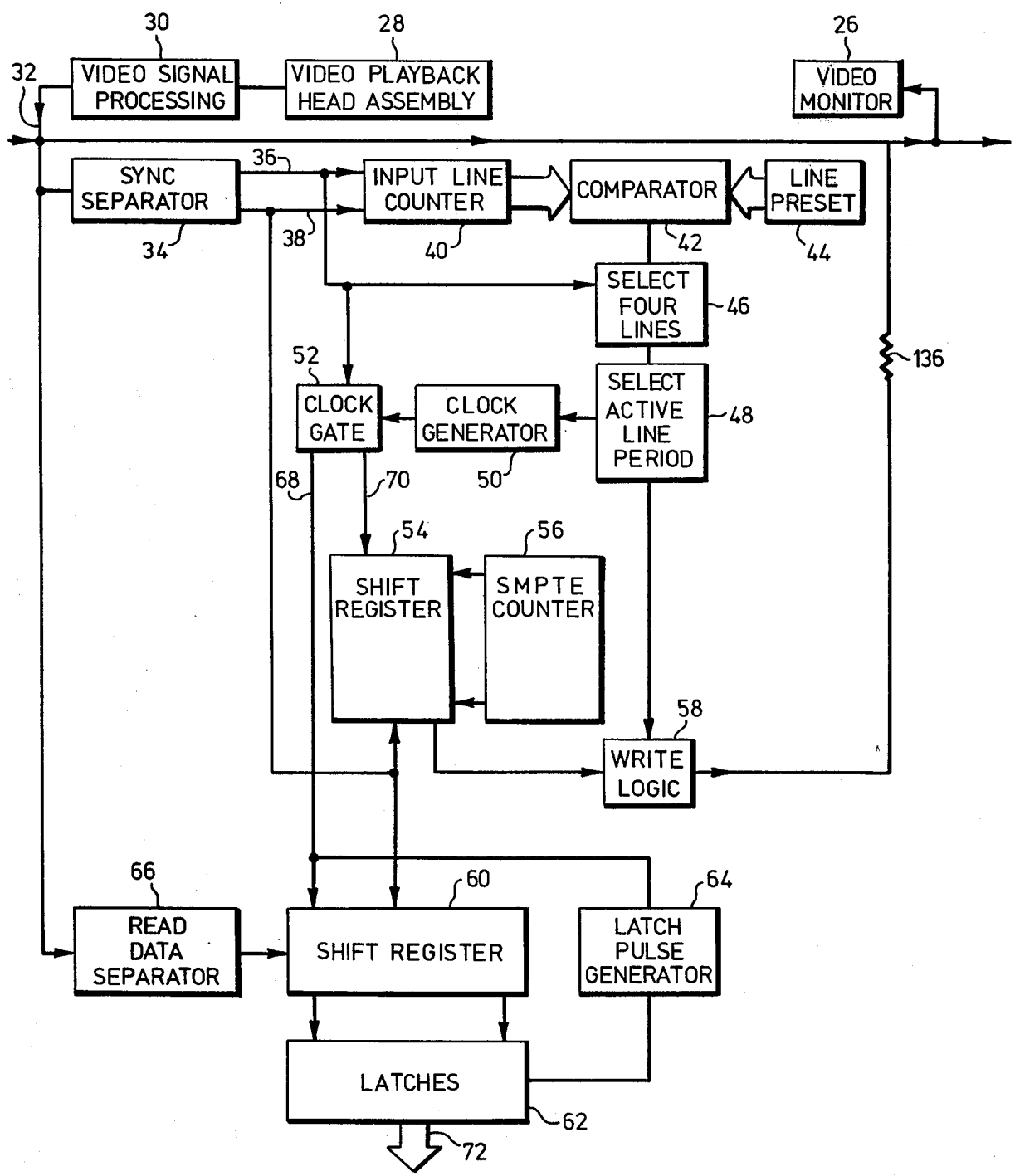

The functions outlined in the preceding paragraph will now be described in more detail with reference to FIGS. 3 and 4. Whilst the invention is described as applied to a half inch or three quarter inch helical scan video tape recorder (VTR), it will be appreciated that in most aspects it is equally applicable to the usually more sophisticated one and two inch machines, or any other machine capable of playing back single frames with the tape stationary or virtually stationary.

A prerequisite of the use of the apparatus and method of the invention is that the video information on videotape used in the editing process incorporates a suitable progressive incremental code uniquely identifying successive frames of video information. A highly suitable code is already in widespread use in the industry, known as the standard SMPTE edit code. Essentially it is a time code in binary form providing an hour, minute, second and frame count in CDB (binary coded decimal) form. Conventionally it is recorded on videotape on a cue channel or a spare audio channel, and includes a synchronizing word and optional additional binary code words between successive four bit BCD words. Only the BCD words are employed in the present application and they are recorded in pairs in the active portions of four successive lines of each field of video information (and hence twice in each frame providing a desirable measure of redundancy). Insertion of the code may be achieved by playing back a video tape on a first recorder 132, the video information being recovered by heads on the rotating playback head assembly 28 which scan sloping paths on the tape as it passes helically around the head assembly. The recovered information is processed in conventional circuitry 28 so as to reconstitute a standard video signal, optionally colour encoded, which is available on a line 32 connected to input of a second VTR 134 in the record mode. The signal on line 32 is also applied to a sync separator 34 which provides horizontal and vertical sync pulses on lines 36 and 38. These pulses are applied to a line counter 40 which may be an 8-stage binary counter clocked by the horizontal pulses and reset by the vertical pulses. The binary outputs of the counter are applied in parallel to a comparator 42 together with a binary word determined by switches in a line preset selector 44. The comparator provides an output when the count of the counter 40 reaches the number preset in selector 44, and this in turn inhibits the counter and determines the line in each field at which insertion of the SEMPTE code commences. This will normally be selected so that the code is inserted in the vertical interval, conveniently on the otherwise blank lines following the vertical blanking interval. It would of course be possible to omit the comparator 42 and selector 44 and use a counter arranged to provide an output and inhibit the count at a fixed line in each field.

The output of comparator 42 clears and enables a shift register 46 which acts to count and pass the next four horizontal sync pulses to a circuit 48 conveniently implemented using monostable multivibrators whose outputs are gated so as to generate from each horizontal sync pulse a delayed and extended pulse lasting the duration of the active line period between the front and back porches of the horizontal waveform. These extended pulses gate on a further multivibrator forming a clock generator 50 having a frequency of at least ten times the line frequency so that at least eight cycles occur in the active line period. A clock gate 52 enabled by horizontal sync pulses from the sync separator 34 and implemented by the first stage of an eight stage shift register acts to gate exactly eight clock pulses in each active line period. Thus during the active periods of the four lines selected by the selector 46, thirty two clock pulses are applied to a thirty two stage parallel-in, serial-out shift register, and simultaneously the selector 48 enables a write logic gate 58 so that the content of the shift register is serially released in four groups of eight bits which are inserted as positive going pulses into the video signal on the line 32 through a resistor 136, which modified video signal is then recorded by the second VTR 134.

The content of the shift register 54 is a SMPTE code word of eight four bit BCD sub-words loaded in parallel from a counter 56 which is formed by a chain of counters similar to that described in more detail below under the reference numeral 92 (see FIG. 4) and similarly provided with a preset control although it need not have an up/down capability. The counter 56 is clocked at half the repetition rate of the vertical sync pulses so as to count at a rate closely approximate to thirty frames per second, and the shift register is loaded in response to each vertical sync pulse so as to reflect the then state of the count. Consequently, each field of the video signal recorded on tape by VTR 134 incorporates four successive lines which in their active period each contain two BCD sub-words of a SMPTE code word.

When the tape so recorded is again played back during editing, the write logic gate 58 is disabled and the video signal on the line 32 is applied directly to the video monitor 26 so that the recorded picture information is available to the operator. Additionally, the video signal is applied to read data separator 66 in the form of an analog comparator which senses transitions of the video signal through a level intermediate between black level and the peak level of the pulses inserted as previously described. Four groups of eight clock pulses fed on line 68 from the clock gate 52 enable a thirty two stage serial-in, parallel-out shift register 60 to accept the pulse signals recovered from the selected four lines of the video signal by the separator 66, the clock pulses on the line 68 being slightly delayed, relative to those on the line 70 which were used during writing of the information, so that any jitter in the video signal as played back does not affect recovery of the signals. A latch pulse generator 64 implemented by monostable multivibrators senses the clock pulses and generates a pulse delayed until after the last of the thirty two clock pulses. The latch pulse causes transfer of the SMPTE code word now appearing at the parallel outputs of the register to the outputs of the thirty two parallel latches 62, whence it is applied on the lines 72 to a digital display 74 and the comparator 22 (see FIG. 4). The shift register 60 is then cleared by the next vertical sync pulse.

Figure 4:
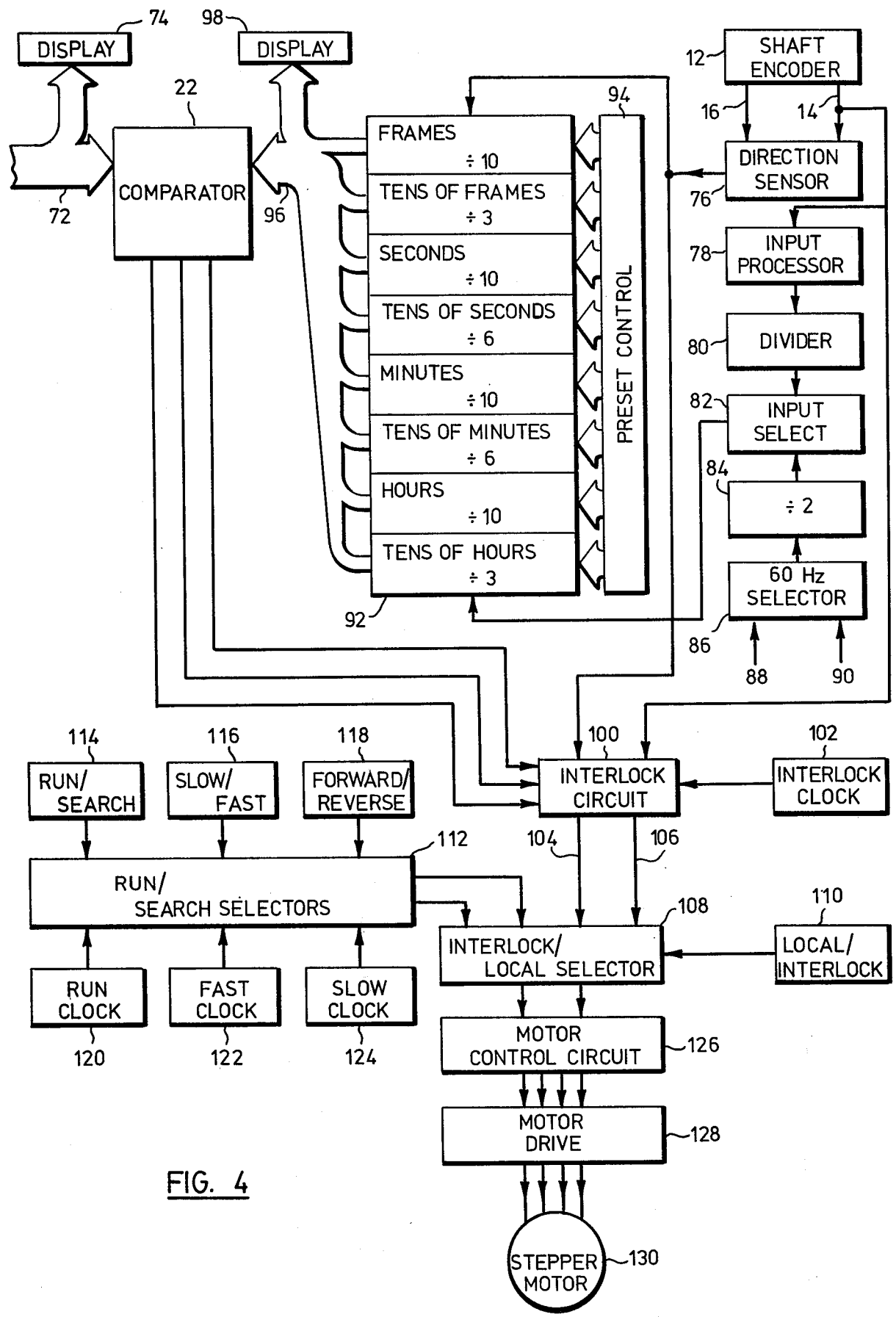

Referring now to FIG. 4, the quadrature outputs 14, 16 of the shaft encoder 12 are applied to a direction sensor 76, in which the pulses on line 14 are delayed and the two sets of pulses applied via exclusive-OR and exclusive-NOR gates to the set and reset inputs of a flip-flop which will change state in response to a change in direction of the encoder, due to the phase reversal of the two pulse trains. This direction signal is applied to the up/down control lines of up/down counter 92. This counter is in fact a chain of eight counters each with four bit outputs, the first counter having a modulus 10 and counting frames, the second counter having a modulus 3 and counting tens of frames, the third counter having a modulus 10 and counting seconds, the fourth counter having a modulus 6 and counting tens of seconds, the fifth counter having a modulus 10 and counting minutes, the sixth counter having a modulus 6 and counting tens of minutes, the seventh counter have a modulus 10 and counting hours, and the eighth counter having a modulus 3 and counting tens of hours. Means 94 are provided for presetting each counter so that the counter may be initially loaded with a predetermined SMPTE code word.

The pulses derived from the shaft encoder outputs in an input processor 78 are applied to a modulo-25 divider 80 so as to provide one pulse for each advance of the sound film equivalent to one frame period of the videotape, and these pulses may be selected by an input selector 82 to clock the counter 92 and thus increment or decrement the SMPTE word appearing at the output of the counter according to the direction of movement of the shaft 4 (see FIG. 2). Alternatively, for some purposes it may be desired to clock the counter from the mains supply frequency or the vertical sync pulses in which case one of these two is selected by a 60 Hz source selector 86 and after division by 2 by a counter 84 the pulses are applied to the counter 92 by the selector 82.

The SMPTE code word appearing at the output of the counter 92 is transmitted by the parallel lines 96 to the digital display 98 and the thirty two bit magnitude comparator 22. The comparator provides three outputs indicating respectively parity, i.e. that the words apply on the lines 72 and 96 are the same; that the word on line 72 is greater than that on line 96; and vice-versa. These outputs are applied to an interlock logic circuit 100 where they act as gating signals which determine the outputs from the circuit on lines 104 and 106. If the comparator provides an output other than parity, pulses from an interlock clock are gated onto the line 106, whilst the logical state of the output on the direction signal line 104 depends on the direction of the deviation from parity. If the comparator provides a parity output, then the direction signal from the sensor 76 is gated onto the line 104, and pulses from the encoder 12 are gated onto the line 106. The signals on the lines 104, 106 are then applied to another logic circuit 108 which determines under control of a local/interlock selector 110 whether these signals or locally generated signals selected by a logic circuit 112 shall be applied to a motor control circuit 126.

The motor control circuit comprises a reversible ring counter 126 which provides control signals to four circuits in a motor drive amplifier 128 which selectively energise four stepper coils in a stepper motor 130 in forward or reverse sequence so as to drive the motor backwards or forwards. The motor 130 is the motive power of the videotape capstan drive (see FIG. 1) and replaces the conventional capstan drive motor. Thus assuming the local/interlock control 110 is set to interlock, and the comparator 22 does not provide a parity output, the interlock clock 102, which may be a free running astable multivibrator, will pulse the stepper motor 130 in a direction determined by the comparator output so as to drive the tape either backwards or forwards in whichever direction will cause frames of video information to be recovered having encoded thereon a SMPTE code word more nearly approaching that appearing on the line 96. It is assumed that the video tape recorder 132 has been modified if necessary to permit reverse running. Instructions for such modification, with special reference to the Sony model AV3650 videotape recorder, may be found in Technical Bulletin No. 10, published by the National Film Board of Canada in December 1972 under the title "Modifications to VTR Equipment to Provide an Improved Method of Editing ½-inch Videotape Recordings". It will also be understood that, rather than using a stepper motor, a conventional motor could be utilized, although a much more elaborate drive circuit with feedback control would be required to obtain the necessary accuracy of control, which is readily obtained with a stepper motor with a simple drive circuit and without feedback, although at the expense of somewhat inferior performance under normal running conditions.

If the output from the comparator 22 indicates that parity exists, fine adjustment of the position of the tape relative to the heads is achieved by applying pulses from the encoder 12 together with the direction signal from sensor 76, to the motor control circuit. This enables movement of the shaft 4 to be used to move the tape so that the playback heads scan a single track thereon rather than transferring from one track to another part way down a field. This causes parts of different fields to appear on the monitor screen separated by a broken area. Movement of this broken area up and down the field by moving the shaft 4 provides an effect somewhat analogous to that provided by moving frames of a conventional film in a projection gate, although the picture content in the present case remains stationary.

If the interlock operation discussed above is not required, the local/interlock control 110 may be set to local, a run/search selector is set to run, and the logic circuit 112 supplies pulses from a run clock 120 to the motor control circuit 126, the clock running at a rate such as to operate the motor 130 to drive the tape at normal speed. In the "local" condition, a search mode is also provided for when it is desired to locate a particular frame on the tape. The search may be conducted in either the forward or in the reverse direction, according to the setting of a forward/reverse control 118 which determines the logical state of the direction signal applied to the control circuit 126. Likewise, a slow/fast control 116 determines which of two clocks, a fast clock 122 and a slow clock 124, is used to pulse the motor so that the tape may be moved either fast or slowly. The actual code of the frame being played back at any time will appear on the display 74 so that the progress of the search can be observed and the controls operated accordingly.

Although the various circuits employed to implement the functions described above have not been described in detail, it will be apparent to those skilled in the art that they can all readily be implemented utilizing conventional circuit techniques and in the main by utilizing readily available digital integrated circuits. It will also be apparent that the arrangement described will enable the picture content of a videotape to be displayed on the monitor 26 just as if that picture content was on photographic film driven through a viewer by the shaft 4. Hence, the sound editing process can be carried out on videotape exactly in the same manner as has been customary for photographic film, with the added convenience of the availability of the SMPTE codes which are shown on the displays 74 and 98.

What I claim is:

1. A method of editing sound for videotape recordings comprising; slaving the movements of a videotape past a video playback head to the movements of a synchronizer shaft which synchronizes at least one sound film being edited, the slaving being accomplished by moving the videotape past the video head in such a direction and for such a distance as to establish parity between progressively coded signals associated with frames of the video information recovered from the tape by the playback head and similarly progressively coded signals generated indicating cumulative displacement of the synchronizer shaft; and displaying the recovered video information.

2. A method of editing sound films for videotape recordings comprising generating signals indicative of the extent and direction of angular movement of a multigang synchronizer shaft which synchronizes the sound film being edited, using said signals proportionately to alter the count of an up/down counter in accordance with the extent and direction of said angular movements so as to provide a counter output encoded in accordance with a progressive incremental numerical code, recovering a video signal frame by frame from a videotape and recovering from said video signal encoded signals associated with the frames thereof, said encoded signals being encoded according to the same system as said counter output, comparing said counter output and said recovered encoded signals in a magnitude comparator, and using the output of said comparator to control a motor moving said videotape past a head assembly used to recover successive frames of the video signal in such a direction as to reduce any difference between the counter output and the recovered encoded signal as detected by the magnitude comparator until or unless the comparator indicates parity thereof.

3. A method according to claim 2, including the further step of using the signals generated by angular movement of the shaft to adjust the position of the tape relative to the head assembly once the comparator indicates parity of the counter output and the recovered encoded signal.

4. A method according to claim 2, including the preliminary step of playing back the videotape recording, the sound for which is to be edited, so as to recover the video signal, inserting said encoded signals into the video signal, and re-recording the video signal.

5. A method according to claim 2, wherein the encoded signals and the counter output are encoded in SMPTE edit code.

6. A method according to claim 5, wherein the encoded signals are divided into portions recorded in the active portions of a plurality of successive lines in each field.

7. Apparatus for editing sound for videotape recordings comprising a drive shaft for ganged positive engagement with at least one sound film, means associated with said shaft to generate signals indicative of the extent and direction of angular movement of said shaft, an up/down counter receiving said signals and counting in response to said signals to provide an output signal in accordance with a progressive incremental numerical code, a videotape recorder having a video playback unit for recovering successive frames of a video signal recorded on the video tape as successive portion of the tape are brought adjacent a video playback head assembly in the playback unit, reversible drive means to move said tape in either direction plast said playback head, code recovery means to recover signals identifying each frame of said video signal and encoded according to the same progressive incremental numerical code as the counter output, a magnitude comparator receiving and comparing the numerical magnitudes of the output signal of the counter and the signal recovered by the code recovery means and providing outputs in accordance with the results of the comparison, and means receiving said outputs and controlling said drive means in accordance therewith so that the drive means moves the tape in such a direction as to cause the signal recovered by the code recovery means to approach parity with that appearing at the output of the counter.

8. Apparatus according to claim 7, further including means responsive to a parity output from said comparator to place said drive means under the control of the signal generating means associated with the shaft.

9. Apparatus according to claim 7, further including means to insert encoded signals in said progressive incremental numerical code into a video signal during recording of a videotape to be edited in said apparatus.

10. Apparatus according to claim 7 or 9, wherein the progressive incremental numerical code is the SMPTE edit code.

11. Apparatus according to claim 8, wherein the drive means comprises a reversible stepping motor, and a capstan drive driven by the stepping motor.

12. Apparatus according to claim 7, wherein the code recovery means comprises means receiving the video signal from the video playback unit, a sync separator, line identification means receiving sync pulses from the sync separator and identifying lines of the video signal carrying the frame identification signals, and means to strip the identification signals from the lines thus identified.

13. Apparatus according to claim 12, further including a clock generator operative during said selected lines, and a serial-in, parallel-out shift register receiving the stripped signals under control of the clock generator and providing the recovered signals in parallel to the comparator.

14. Apparatus according to claim 7, wherein the signal generating means associated with the drive shaft comprises a shaft encoder providing two out-of-phase pulse outputs, and means receiving said pulse outputs and generating therefrom a train of pulses proportional to the angle through which the shaft is moved, and a direction signal dependent on the direction in which the shaft is moved.

15. Apparatus according to claim 7, in which a movement of the shaft corresponding to an advance of a length of sound film equivalent to one frame of picture information produces a plurality of pulses.

16. Apparatus according to claim 15, wherein the drive means is an electric motor and the means receiving the outputs of the magnitude comparator applies a train of clock pulses and an appropriate direction signal to a motor control circuit in response to a non-parity output from the comparator, whilst applying the train of pulses and the direction signal from the signal generating means associated with the drive shaft to said motor control circuit in response to a parity output from the comparator.

* * * * *